United States Patent

Sbicca

[11] 4,326,345
[45] Apr. 27, 1982

[54] ARTICLE OF FOOTWEAR

[76] Inventor: Peter J. Sbicca, 2895 Lorain Rd., San Marino, Calif. 91108

[21] Appl. No.: 32,166

[22] Filed: Apr. 23, 1979

Related U.S. Application Data

[60] Division of Ser. No. 609,395, Sep. 2, 1975, Pat. No. 3,987,510, and a continuation of Ser. No. 697,145, Jun. 17, 1976.

[51] Int. Cl.³ ............................................... A43B 5/00
[52] U.S. Cl. ...................................................... 36/135
[58] Field of Search ........................... 36/133, 4, 7.3; 12/142 R, 142 E, 142 EV

[56] References Cited

U.S. PATENT DOCUMENTS 1,958,107  5/1934  Merrill et al. ........................ 36/135
3,858,336  1/1975  Brown .................................. 36/135

Primary Examiner—Patrick D. Lawson
Attorney, Agent, or Firm—Sellers and Brace

[57] ABSTRACT

An article of footwear which comprises a ringlet of elastic webbing forming the upper thereof with its lower longer edge embedded in elastomeric composition which takes a set at low temperature to form a unitary sole and heel inseparably bonded to the upper. If the sole is made to be worn over athletic shoes of the type equipped with spikes or cleats, the interior of the sole is molded to provide cavities accommodating such spikes or cleats. The rims of these cavities bear against and support the rim areas of the sole and heel of an athletic shoe thereby preventing the spikes from penetrating the sole of the footwear. The elastic webbing is tailored to shape merely by forming a dart crosswise of the midportion of the toe end thereof.

12 Claims, 6 Drawing Figures

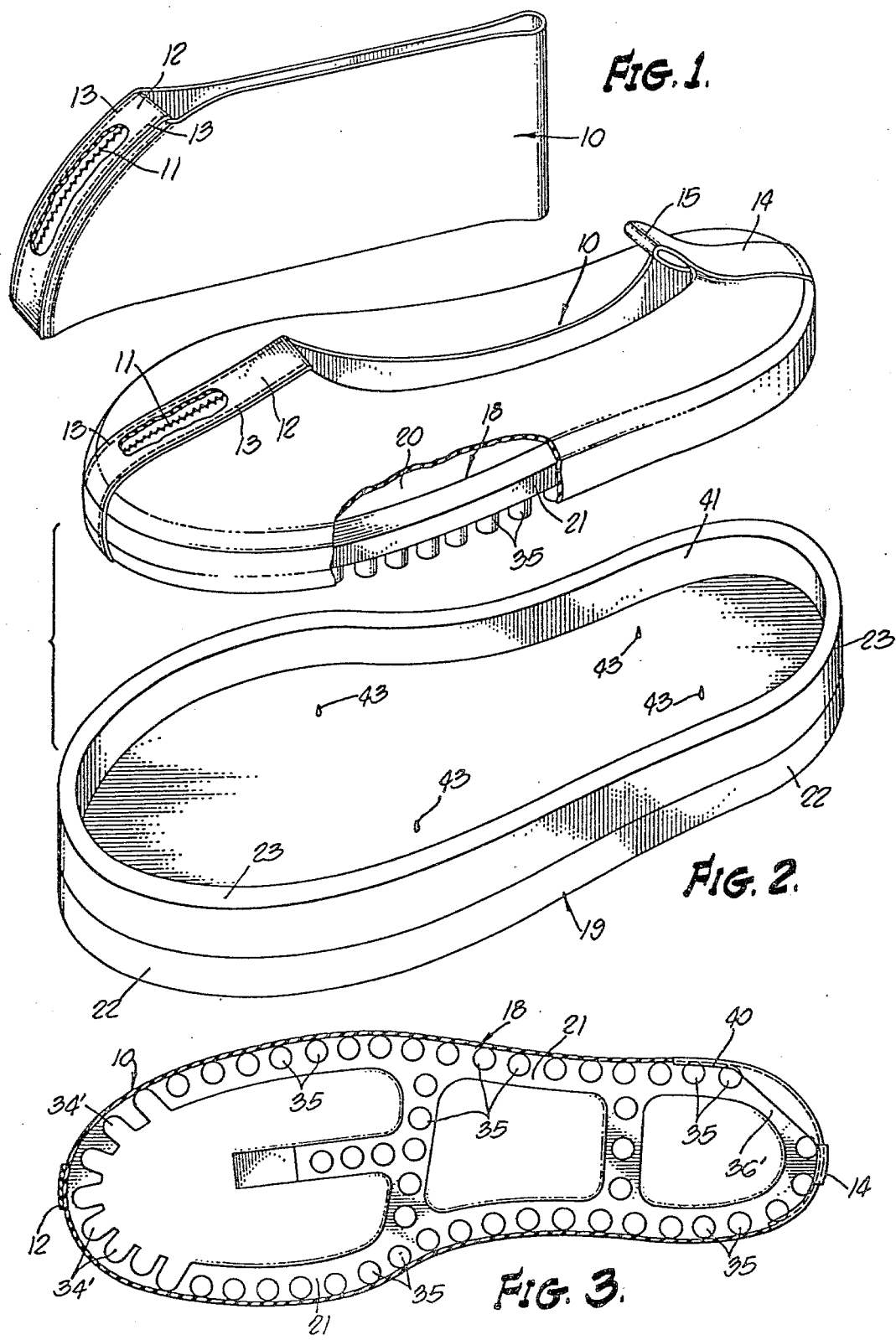

ARTICLE OF FOOTWEAR

This application is a division of my copending application for United States Letters Patent Ser. No. 609,395 filed Sept. 2, 1975, now U.S. Pat. No. 3,987,510, and a continuation of my application Ser. No. 697,145 filed June 17, 1976 for Article of Footwear.

This invention relates to footwear, and more particularly to a simple, easily constructed slipper or overshoe having an upper formed of elastic webbing with its lower edge embedded in a sole and heel of molded elastomeric material.

Various proposals have been made heretofore to provide an item of footwear having a flexible sole provided with some means for securing the same to the foot or to an article of footwear in place on the foot. Typical examples are shown in the U.S. Pat. to Knizek Nos. 1,406,657; Beals 2,076,316; and Gilbert 2,801,478. Each of these patents shows a sole provided with thonging or the like securable about the foot or about another shoe already in place on the foot. Other proposals have been made for an item of footwear in which the sole includes portions of an upper molded integral with the sole and designed to grip the foot or a shoe worn on the foot to hold the outer footwear in place. Examples of such footwear designed to be worn over a spiked or cleated shoe are disclosed in the U.S. Pat. Nos. to Degge 1,811,781; Friedenberg 2,032,052; and Lougheed 2,958,963.

The thonging or tie means employed to hold the first mentioned type of auxiliary sole to the wearer's foot is unsightly, time consuming to secure about the foot, and is objectionable more particularly because tending to disfigure, chafe, and discolor portions of the footwear in contact with the securing thongs or ties. The shoe protector devices proposed in the second group of prior art patents avoid many of the objections had to the first group but are subject to the serious disadvantage of being difficult to retain assembled to an athletic or golf shoe unless made for a particular size and design of shoe. Each comprises a one-piece molded item of homogenous elastomeric material having an upper of the same material as the sole and required to be contoured and sized to have a reliable gripping fit with the wearer's regular shoe. A particularly serious additional objection is the fact that each of these prior constructions must be made with costly molds suitable for molding and curing rubber or the like elastomeric material in costly ovens and associated equipment but not required in the manufacture of this invention.

The present invention avoids the numerous shortcomings and disadvantages of prior constructions and particularly the costly manufacturing procedures and equipment required in making prior shoe products to meet the needs here contemplated. Only the simplest and most inexpensive molding equipment is required to make the footwear herein disclosed. The footwear comprises two components comprising an upper made from conventional elastic webbing and a sole molded thereto and consisting of an elastomeric plastic composition which takes a set at low temperature such as normally prevailing in a manufacturing room. The sole material takes a set in a short period of time and is quickly removed from between the mold parts without need for finishing operations and in readiness for packaging and shipment. The elastic webbing of the upper accommodates a wide range of differences in shoe design and a considerable range of differences in manufacturing tolerances, shoe shapes and widths. The upper embraces and covers a principal portion of the wearer's normal shoe, or his foot if worn as a slipper, and presents a neat appearance without risk of disfiguring, chafing, or discoloring any part of the shoe over which it is assembled. The footwear can be used not only to protect floor and pavement surfaces against disfiguring by spikes, but also as a protective cover for an athletic shoe when not actually in use on the playing field or in athletic activities.

Accordingly, it is a primary object of this invention to provide an improved article of footwear and a unique method of making the same.

Another object of the invention is the provision of an improved article of footwear comprising an upper formed of elastic webbing the lower perimeter edges of which are molded to elastomeric material.

Another object of the invention is the provision of an overshoe article of footwear of simple but rugged construction which is readily assembled snugly over an athletic type shoe and having cavities accommodating spikes, cleats, and the like commonly present on athletic footwear, and providing protection for such footwear as well as safeguarding floors, pavements, and other surfaces against damage by spiked or cleated athletic shoes.

These and other more specific objects will appear upon reading the following specification and claims and upon considering in connection therewith the attached drawings to which they relate.

Referring now to the drawings in which a preferred embodiment of the invention is illustrated:

FIG. 1 is a perspective view of the upper in an intermediate stage of construction;

FIG. 2 is an exploded perspective view of the finished upper assembled over the male mold member and in readiness to be lowered into the female mold member;

FIG. 3 is a view of the underside of the male mold member as viewed in FIG. 2 but showing the major portion of the perimeter of the upper in cross-section;

Figure 4:
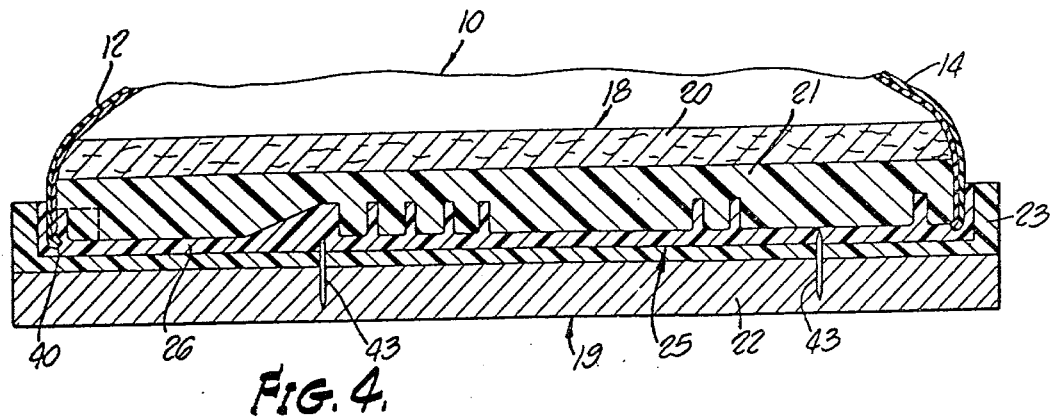
FIG. 4 is a cross-sectional view but prior to the separation of the mold members.

Referring initially to FIG. 1, there is shown a typical upper of the improved footwear designated generally 10. The upper comprises a single length of high-strength elastic webbing having a width sufficient to enclose or embrace a substantial height of the wearer's foot or of the upper of an athletic shoe over which it is to be assembled. A principal fabricating operation is to form a dart crosswise of the ringlet in an area overlying the central portion of the toe-embracing end of the ringlet. This dart may be formed in a conventional manner or, if desired, the two ends of the ringlet may be cut off on the bias following which the ends are secured together in abutting relation by zigzag stitching 11. Thereafter this stitching is concealed and reinforced by covering the seam with a length of strong strapping or tape 12 stitched in place by stitching 13. A similar length of strapping 14 is stitched crosswise of the opposite or heel end of the upper in a manner forming a pull-on loop 15.

Figure 5:
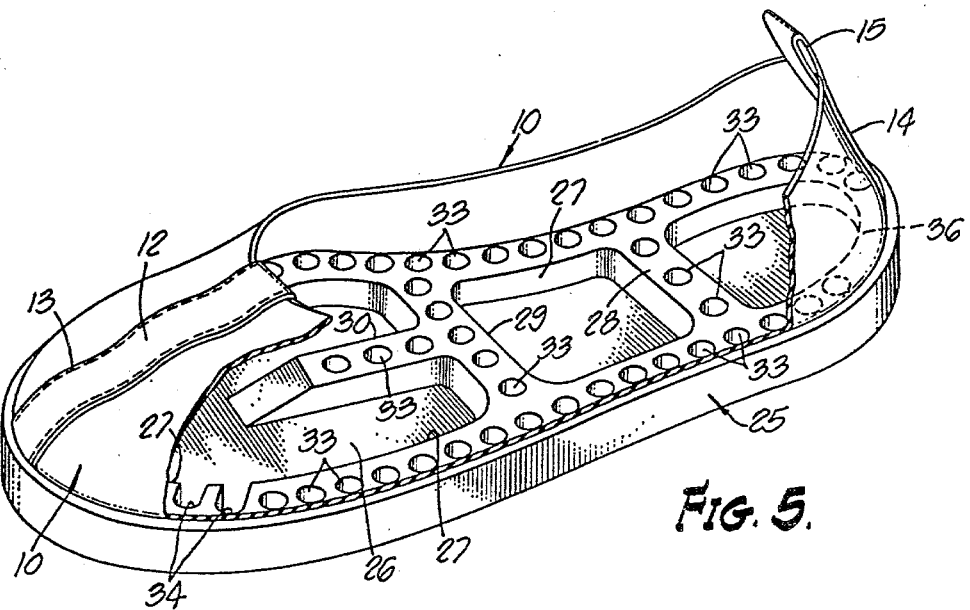
FIG. 5 is a perspective view with portions of the upper broken away to show details of the interior of the sole.
Figure 6:
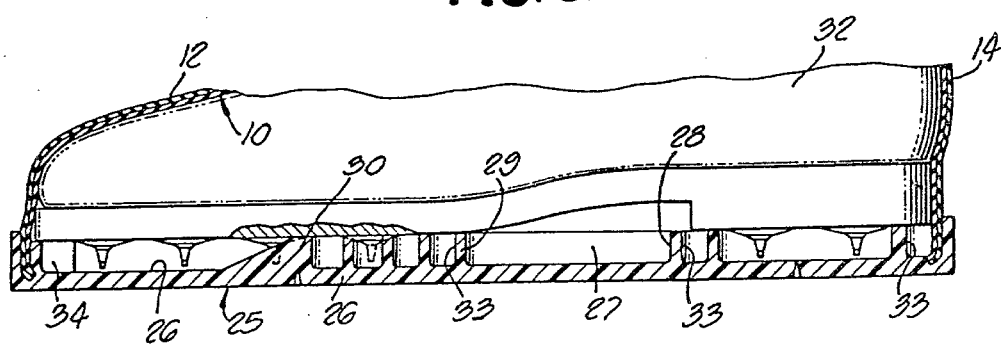
FIG. 6 is a fragmentary cross-sectional view of the footwear while assembled to a typical golf shoe.

After the upper ringlet 10 has been completed, it is in readiness to be molded to the sole. This is accomplished using a male mold member 18 and a female mold member 19. The two mold members may be formed inexpensively of cheap, easily worked materials. Typically, male member 18 has a wooden main body 20 laminated to a facing member 21 of rather high durometer elastomeric material, such as polyurethane. Likewise, the lower or female mold member 19 has a wooden main body 22 laminated to the female mold face member 23 of a relatively soft, flexible elastomeric material to facilitate separation of the two mold members after the sole of the footwear has taken a set. The exposed surface of the male mold member 21 has a shape complementary to the finished interior portion of the sole of the footwear to be made as best shown in FIG. 5. Major portions 26 of sole 25 are relatively thin and flexible. A thick, relatively wide rim 27 (FIG. 5) embraces and is integral with the rim portion of the sole. Similarly shaped load-bearing, weight-supporting walls 28,29 and 30 (FIG. 5) are provided intermediate the opposite ends of the interior of the sole and supplement the rim portions 27 in supporting the weight of the wearer's foot when the article is assembled thereover. Wall 28 extends crosswise of the sole beneath the forward end of the heel whereas the generally T-shaped walls 29 and 30 extend crosswise of the footwear beneath the forward half of the footwear. These upstanding walls 27, 28, 29 and 30 serve to transfer weight from the wearer's shoe 32 (FIG. 6) and the sole proper 26 of the overshoe.

In order to reduce the weight of the overshoe, the upstanding weight-supporting walls 27 to 30 are preferably provided with wells or cavities 33, 34. These are formed by the posts 34' and 35 projecting downwardly from the underside of base 21 of the male mold member 18. Wells 33 are here shown as circular whereas the wells 34 at the toe end are actually notches opening inwardly through the interior side wall of the upstanding wall 27. Forming the wells 34 in this manner facilitates separation of the mold members at the end of the molding operation as will be explained more fully presently.

Attention is also called to the heel portion of the sole shown in FIG. 5 wherein it will be noted that a portion 36 of wall 27 embracing the outside corner area of the heel lacks wells 33. This portion of the sole is subject to greater wear in normal use for which reason wells 33 have been omitted.

The molding operation is performed after tailoring the upper ringlet 10 in the manner described above. It will be noted from FIG. 1 that, by reason of the dart, the girth at the upper edge of the upper is substantially shorter than the lower girth. Upper 10 is assembled over the perimeter of the male mold member 18, care being exercised to locate the seam covering the dart at the toe end of the upper centrally over the forward end of the male mold and in alignment with the longitudinal axis of the mold. The longer girth of the upper is substantially shorter than the perimeter of the male mold member with the result that when it is assembled thereover with a narrow width of its longer edge projecting below the plane of the lower surface of member 21, the rim edge 40 of the upper will naturally contract and curl inwardly as is clearly shown in FIG. 4.

This mold subassembly is now in readiness for insertion into the upwardly facing mold member 19 after a charge of uncured polyurethane or the like plastic elastomeric composition has been charged thereinto. The interior vertical surface 41 of the mold cavity is preferably substantially wider and longer than the upper mold subassembly 10, 18. A sufficient charge of the polyurethane is placed in the lower mold member to assure that the charge will rise to the top surface of the lower mold member when the upper mold assembly is properly positioned therein and supported on the pointed support pins 43 four of which are shown in FIGS. 2 and 4. Any excess portion of the charge overflows the top rim edge of the lower mold member. The polyurethane takes a set in a short curing time, preferably at room temperature and under atmospheric pressure. After the elastomeric material has cured and taken a firm set, the mold members are separated by lifting the heel end of the inner mold member 18 upwardly out of the heel end of the shoe. During this operation the posts 34' forming the notched wells 34 (FIG. 3) pivot inwardly toward the heel end and thence outwardly from between the side of wells 34.

No finishing operations of any kind are necessary and the resulting produce is ready for packaging and shipment.

It will be recognized that the described footwear is also suitable for use as a slipper or light shoe eliminating the upstanding walls or ribs 27–30 and modifying the sole to include a heel of suitable height.

While the particular article of footwear herein shown and disclosed in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

I claim:

1. Footwear comprising an upper formed from a continuous ringlet shaped to snugly embrace the heel, toes and either side of the foot, the lower edge of said ringlet being embedded and inseparably bonded to a one-piece molded sole member of elastomeric material compounded to cure the take a set at room temperature while bonding the lower edge of said ringlet thereto, and the perimeter portion of said sole member in which the edge of said ringlet is embedded being substantially thicker than major other portions of said sole member inwardly of said perimeter portion.

2. Footwear as defined in claim 1 characterized in that the toe-embracing end of said ringlet is tailored to cooperate with the adjacent end of said sole member to form a pocket to receive and snugly embrace the forwardly extending toe end of the foot.

3. Footwear as defined in claim 1 characterized in that said ringlet is tailored dart-fashion crosswise of the toe-embracing end thereof in such manner that the lateral edge of said ringlet remote from said sole member is substantially shorter than the edge embedded in said sole member.

4. Footwear as defined in claim 1 characterized in that said toe-embracing end of said ringlet is dart-tailored to form a toe-receiving pocket with the adjacent end of said sole member.

5. Footwear as defined in claim 1 characterized in that the perimeter portion of said sole member in which the adjacent edge of said ringlet is embedded provides a ledge along the inner side of said ringlet engageable with the juxtaposed bottom surface portions of the sole and heel of a slightly smaller size shoe equipped with spikes, cleats or the like projections fixed to the bottom surface thereof.

6. Footwear as defined in claim 1 characterized in that said sole member is a polyurethane compound formulated to take a set substantially at room temperature.

7. Footwear as defined in claim 1 characterized in that said upper is formed from a length of elastic fabric of uniform width, each end of said elastic fabric being severed on the bias, and said bias-severed edges being permanently secured together to form the toe-embracing end of said ringlet.

8. Footwear as defined in claim 7 characterized in the provision of a finger-engaging loop secured to the heel-seating end of said ringlet and projecting from the lateral edge of said ringlet remote from said sole member.

9. An article of manufacture comprising footwear having an upper formed from a continuous ringlet of elastic material provided with a deep dart crosswise thereof and overlying the toe-receiving end of said footwear, thereby to very substantially shorten one lateral edge of said ringlet, and the other longer edge of said elastic ringlet being embedded in and inseparably bonded to the perimeter of a unitary sole and heel member.

10. An article of manufacture as defined in claim 9 characterized in that the lateral edge of said sole and heel projects outwardly from the exterior surface of the adjacent portions of said upper.

11. An article of manufacture as defined in claim 9 characterized in that the interior of said sole and heel is provided with cavities to receive the spikes of golf shoes when said footwear is assembled thereover.

12. An article of manufacture as defined in claim 9 characterized in that said footwear is adapted to be assembled over another article of footwear and said elastic upper being effective to contract snugly thereagainst and firmly grip said other article of footwear.

* * * * *